April 13, 1954  G. DOWNING  2,675,050
APPARATUS FOR FLARING THE END-PORTIONS OF TUBES
Filed Nov. 16, 1951  2 Sheets-Sheet 2
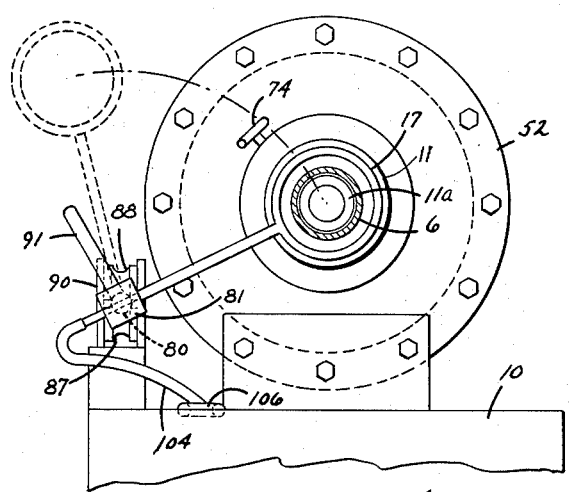
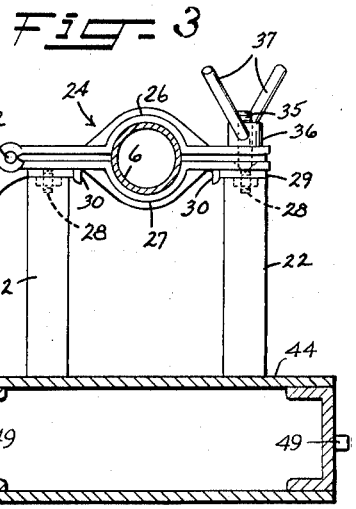
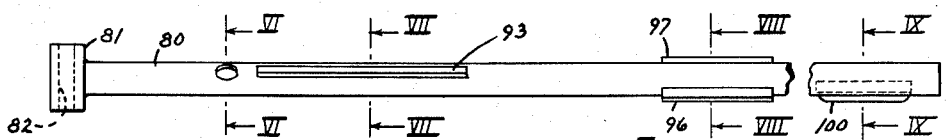
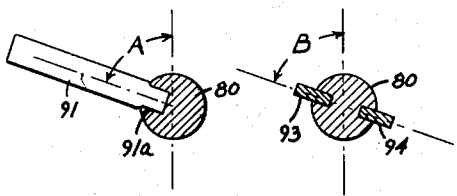
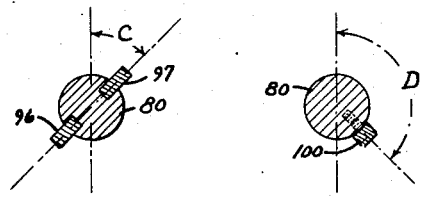
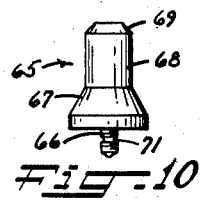
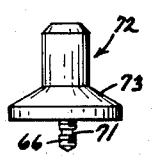
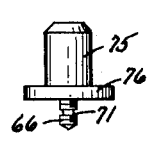
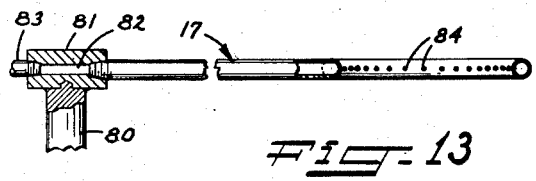
INVENTOR.
GEORGE DOWNING
BY
Thomas R. O'Malley
ATTORNEY.

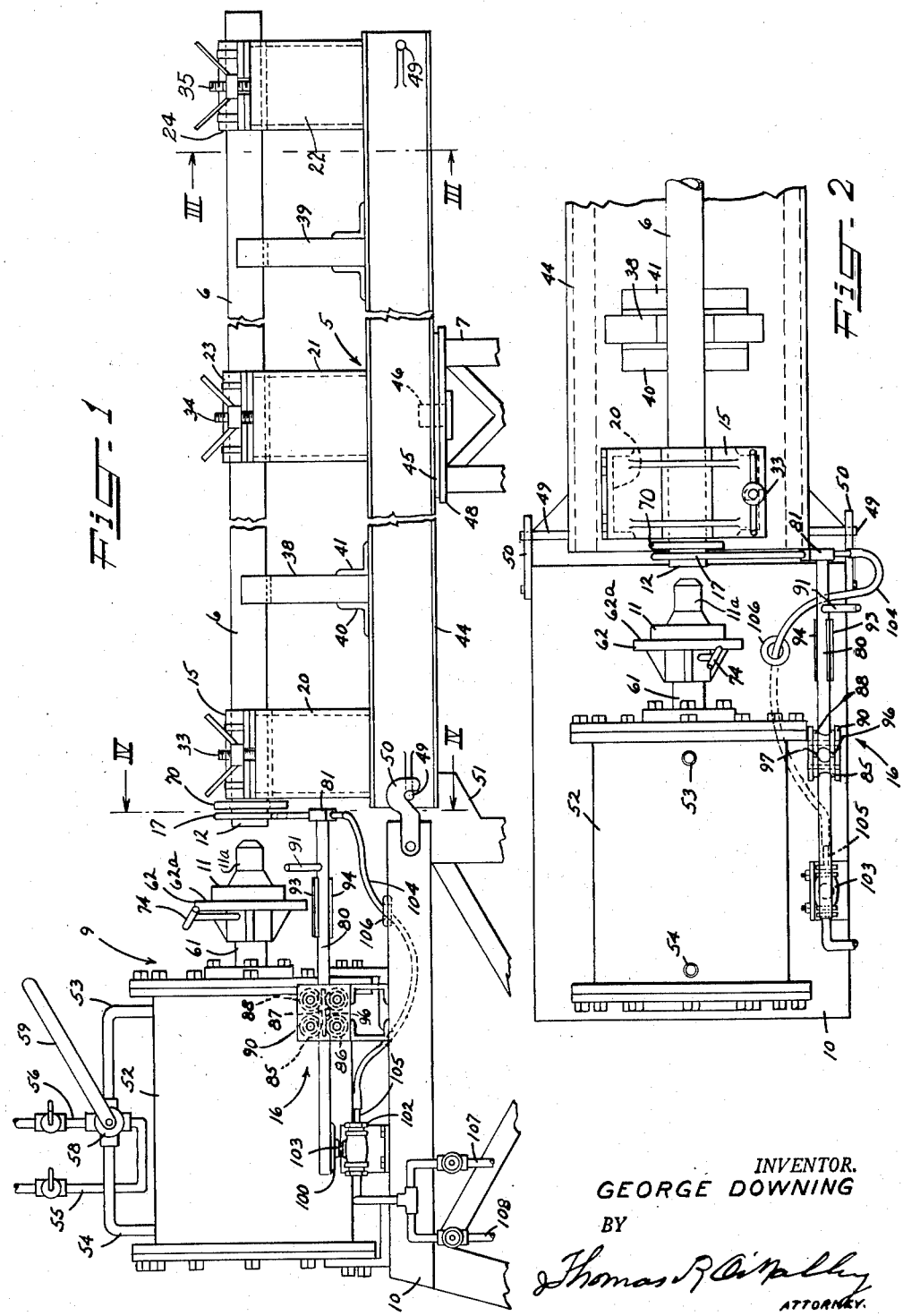

Patented Apr. 13, 1954

2,675,050

UNITED STATES PATENT OFFICE 2,675,050

APPARATUS FOR FLARING THE END-PORTIONS OF TUBES

George Downing, Parkersburg, W. Va., assignor to American Viscose Corporation, Philadelphia, Pa., a corporation of Delaware Application November 16, 1951, Serial No. 256,655

4 Claims. (Cl. 153—79)

The present invention relates to apparatus for preparing the end-portions of tubes whereby a plurality of such tubes may be joined to form a conduit. The apparatus hereinafter described is particularly adapted for flaring the end-portions of pipes and forming a type of joint known as the Van Stone joint which comprises tube or pipe end-portions which extend through separate ring members, and are flared or flattened over radially-extending surfaces of the ring members to form flanges on the adjacent ends of separate tube or pipe sections. The flanges in such a joint engage each other in coaxial relationship within the joint; the joint is secured by drawing the ring members together by means such as a plurality of bolts.

An object of the present invention is to provide an easily operated machine for forming flanges and flange-type joint portions on pipes or tubes. Another object is to greatly reduce the cost and the time entailed in the forming of such flanges or joint-portions by the manual operations conventionally performed. Still another object is to provide apparatus for forming joint-portions on pipes or tubes of substantial diameter, i. e., when the inside diameter thereof is greater than two inches. A specific object is to provide a machine for forming joint-portions in large lead pipes, such portions comprising an end portion of the pipe flared over the radially extending surface of a ring of stronger material, such as steel or cast iron. Other objects, features and advantages will become obvious from the following description of the invention and the drawing relating thereto in which:

Fig. 1 is a partial elevation of pipe-joint forming apparatus according to the invention;

Fig. 2 is a plan view of the apparatus shown in Fig. 1;

Fig. 5 is a fragmentary section view taken along line III—III of Fig. 1;

Fig. 4 is a fragmentary section view of the apparatus taken along line IV—IV of Fig. 1;

Fig. 5 is an enlarged view of a burner-supporting member shown in the prior figures;

Figs. 6, 7, 8 and 9 are section views taken along lines VI—VI, VII—VII, VIII—VIII, and IX—IX of Fig. 5 respectively;

Figs. 10, 11 and 12 illustrate annular flaring dies used in the apparatus generally illustrated in Figs. 1 and 2; and Fig. 13 is a fragmentary view partially in section of a burner and the holder therefor.

To accomplish the objects of the present invention, a machine is provided comprising a pipe holder mounted pivotably for rotation of a pipe or tube with respect to an axis transverse thereto to position either end thereof in a work station, a heater for applying heat to the periphery of the end-portion of the pipe projecting from the holder into the work station, a support for transferring the heater from an operating position to a position which is substantially offset with respect to a pipe supported in the holder, an automatic mechanism for controlling the transmission of fuel to the heater responsive to the various positions of the heater, and a power ram for forcing a flaring tool toward, and into, the end-portion of a pipe positioned in the work station, the ram serving also to retract the tool from the pipe end-portion after shaping it.

In Fig. 1 is illustrated in elevation a holder 5 for a pipe 6 pivotably mounted on a stand 7, and a fluid-cylinder and ram mechanism 9 mounted on another stand 10 for driving a flaring tool such as the annular die 11 shown into the end-portion 12 of the pipe 6. The pipe projects beyond a clamp 15 of the holder 5. An assembly 16 movably supports a burner 17 shown in its heat-applying position in concentric relationship with the pipe portion 12. The holder 5 comprises a plurality of standards 20, 21, and 22 to which clamps 15, 23 and 24, respectively, are secured by means such as bolts. The clamps as well as the standards may be identical as shown. The clamps comprise an upper and lower member and may be secured to the standards in the manner as shown in Fig. 3 wherein clamp 24, comprising members 26 and 27, is secured to the standard 22 by a plurality of flat-headed bolts 28 extending through the lower member 27 and the plates 29 of the standard. For additional accuracy in positioning the clamp in a direction transverse to the axis of the tube 6, guide elements 30 may be secured, as by welding, to the lower surface on the lower clamp member 27. The other clamps 15 and 23 are fastened to respective standards in the same manner.

To enable the clamps to hold the pipe 6 against the pressure of the ram, bolts 33, 34 and 35 are provided. The heads of these bolts are preferably secured permanently to the standard, as shown in Fig. 3, wherein the head of bolt 35 is secured to a plate 29 as by welding. The upper and lower members of the clamp are slotted as shown to accommodate the bolt 35. A nut 36 having a pair of handles 37 is used to tighten the members of the clamp about the pipe 6. The clamps are removable from the standards and may be replaced with clamps of similar construction adapted to fit pipes of different sizes. Other standards may be provided for additional support between the clamps, such as standards 38 and 39. As shown, standards 38 and 39 are simply constructed wooden blocks with their top edges suitably notched to receive the pipe. They may be supported by being slidably held between a pair of angle-pieces, such as elements 40 and 41 which support the standard 38.

The standards are all supported on a beam 44 which may be constructed of standard structural shapes as illustrated in Fig. 3. To the beam 44 is secured a pivot plate 45 apertured in the center to receive a pin 46. The lower surface of the plate 45 engages the upper surface of a top plate 48 of the stand 7. The pin 46 is secured preferably to the plate 48 so that the holder 5 may be readily lifted from the stand 7, and to facilitate guiding of the pin into the aperture of the plate 45 when the holder is placed on the stand. As the plate 45 is parallel, as shown, with the longitudinal direction of the beam 44 and the tube 6 supported in the standards 20, 21 and 22, the holder 5 necessarily rotates about an axis generally perpendicular to the length of the tube. To place either end of the holder 5 in the relationship with the stand 10 as shown in Fig. 1, the axis of rotation is necessarily midway along the length of the holder and the tube 6. The holder is provided with detents or dogs 49 which extend laterally with respect to the length of the holder from both sides of each end-portion of the holder over which are dropped a pair of hooks 50 when an end of the holder is properly positioned adjacent the stand 10 for the end-portion of the tube 6 to receive the flaring die 11. The hooks 50 are pivotally secured to the stand 10, and when hooked over detents 49, receive in tension substantially all the force exerted by the ram on the end-portion of the pipe 6 during a shaping operation. Absorption of this force by the stands 7 and 10, or the pin 46 is thus obviated. The holder 5 and the stand 10 have horizontally overlapping portions comprising a shelf-like extension 51 of the stand 10 which has an upper flat surface adapted to be engaged by a downwardly-facing surface of the beam 44 of the holder and on which the end-portion of the beam rests to accurately position the end of the holder at the right elevation for operation. The upper surface of the extension 51 and the under surface of the beam 44 which engages the upper surface of the extension, are generally surfaces of revolution with respect to the axis of rotation of the holder 52 whereby such surfaces may be engaged and disengaged by rotation of the holder.

A fluid cylinder 52 is satisfactorily operated by admission of a low viscosity oil to one or the other of its ends through tubes 53 or 54 to develop the force required in shaping operations performed by the apparatus. The fluid may be supplied, for example, through a line 55 and returned to a reservoir or pump system (not shown) through a line 56. A conventional four-way reversing valve 58, operated by a lever 59, enables the simultaneous admission of fluid to one end of the cylinder from the line 55 and discharge of the fluid from the other end thereof into the line 56. Mounted on the exterior end-portion of the piston rod 61 of the cylinder is a ram-head 62. The cylinder is mounted and aligned on the stand 10 so that the axis of the piston rod 61 and the direction of the ambit thereof coincide with the axis defined by the pipe-engaging surfaces of the clamps of the holder 5 when the holder is held in operating position by the hooks 50. The head 62 has an aperture extending inwardly from the center of its face 62a for receiving a complementary extension of any one of the dies illustrated in Figs. 10, 11 and 12.

To form flanged or flanged end-portions of tubes by the apparatus herein described, it is a preferred procedure to progressively work the material of the tube to the desired shape through a series of steps using a different die to accomplish each step. Accordingly, the dies which are progressively applied to the end-portion of a tube have annular flared shaping surfaces which have progressively greater angular deviation with the axis of the die than that of the tube. Each die may be provided, as shown in Figs. 1, 10, 11 and 12, with a central centering portion adapted to fit within the normal bore of the tube (see portion 11a of Fig. 3). For example, in carrying out such a shaping operation, the end of the tube is heated by the annular burner 17 until the material of the end-portion of the tube is substantially softened or rendered sufficiently ductile to be easily deformed without splitting, cracking, or other injury to the material. A die 65 as shown in Fig. 10, secured coaxially to the face of the fixture 62 by extension of a projection 66 thereof into the aforementioned aperture, is forced into the end-portion of the tube until the leading edge of a flared surface 67 (occurring at the junction of the surface 67 and the cylindrical surface 68 of the centering portion of the die) has reached the point desired for the small end of the flared tube-portion.

The small end of the flared portion will correspond, in the usual operation of the machine and in the absence of a separate flange piece 70, approximately to the end of the clamp 15 nearest the ram. When the flange 70 is placed over the end-portion of the pipe prior to the shaping operation, the flare extends merely to the face of the flange 70 facing toward the ram. The surface 68 of the die 65 may be cylindrical or slightly tapered to a smaller diameter in a direction extending from the surface 67. The maximum diameter of the surface 68 is preferably no greater than the minimum inside diameter to which the pipe 6 is normally manufactured. The die 65 is provided also with a tapered guide surface 69 to facilitate insertion of the die into the tube 6. The die 65 is forcibly retracted, if necessary, by reversing the operation of the cylinder 52 by an appropriate change in the setting of the valve 58. To lock the die against separation from the ram-head, the projection of each die has a circumferential groove, such as groove 71 of the die 65, into which projects a set-screw 74 which extends in threaded relationship through a section of the ram-head 62.

The die 65 is then replaced with a die 72 having the same general construction as the die 65 but having a surface 73 of greater deviation with its axis than the surface 67 of the die with its axis. For example, the angular deviation of surface 67 might be 30° whereas the deviation of surface 73 with its axis may be in the neighborhood of 60°. The ring 17 is again moved into position for heating in concentric relationship with the partly flared tube end. Heating is continued until the material comprising the end-portion of the tube is substantially softened. The ring 17 is then moved into an out-of-the-way position and the ram with the die 72 mounted thereon is advanced into the partly flared end-portion 12 to accomplish additional flaring. After retraction of the die 72, the end-portion 12 is subjected to a further heating operation while the die 72 is exchanged for a die 75 having a shaping surface 76 which may be approximately normal to its axis. The burner is again removed from the vicinity of the tube end and the die 75 is applied thereto to complete the flaring operation. When the die is retracted, the hooks 50 may be disengaged from the detents 49 and the holder 5 rotated to position the unflared end-portion of the tube in adjacent and aligned relationship with the ram head 62 to undergo the shaping procedure just described. The holder is secured to the ram-supporting assembly by engagement of the hooks 50 with another pair of detents 49 preparatory to the shaping operation.

The burner 17 is supported on the shaft 80 in fixed relationship therewith by a head-portion or block 81 secured to the end thereof. As explained hereinafter, the shaft 80 is pivotable to carry the burner to a position that is substantially laterally offset with respect to the lengthwise direction of the pipe and in the clear of other moving portions of the apparatus. The block 81 has a passageway 82 threaded along the opposite end-portions thereof into which the burner 17 and a nipple 83 are screwed. The block 81 is fastened to the end of the shaft 80 by any suitable means such as the weld fillet shown. The burner 17 has a multiplicity of apertures 84 along its inner periphery which direct the flame in a radial direction toward an article when inserted through the burner. The holes 84, or any equivalent duct means provided for directing the flame, need not necessarily direct the flame in a radial direction so long as it is directed generally toward the axis of the burner. A position of the burner relative to the surface to be heated may be selected in accordance with any alignment of the flame not in agreement with a direction normal to the axis of the burner.

The shaft 80 is supported by, and is movable longitudinally between, four rollers 85, 86, 87 and 88 secured rotatably within a frame 90 in a direction generally parallel with the direction of movement of the ram head 62. The rollers are arranged in pairs as shown, the rollers of each pair being disposed on opposite sides of the shaft and spaced to provide clearances or passageways between peripheral surfaces of the rollers of each pair on opposite sides of the shaft for two sets of radial extensions such as the diametrically opposed splines or feather keys shown attached to longitudinally spaced sections of the shaft 80. As shown in Figs. 1 and 2, the rollers are formed with arcuate grooves to fit the periphery of the shaft 80. The rollers also have cylindrical surfaces adjacent the ends thereof between which each set of keys may pass as the position of the shaft 80 and the burner is changed. A handle 91 is attached to the shaft to facilitate shifting of the shaft and the burner between positions in which the corresponding sets of keys extend through the guide rollers 85 to 88. The handle may be secured in press fit as illustrated by forcing a stub portion 91a thereof into a complementary bore extending radially into the shaft 80, or if preferred, by threaded relationship (not shown). The set of keys 93 and 94 hold the burner, when they extend through the frame 90 and the rollers secured therein, in the position in which the burner is retracted to a region laterally and axially offset from its position surrounding the end-portion 12 of the tube. The burner, when retracted, is positioned substantially from the axis of the pipe 6 and the ram assembly may then be moved also in a direction toward the right from the position shown in Figs. 1 and 2. The set of keys 96 and 97 extend, as shown in Figs. 1 and 2, between the rollers 85 and 86 when the burner is positioned to surround and heat the end-portion 12 of the tube 6.

Figs. 6, 7, 8 and 9 are all cross sections of the shaft 80 with parts fixed thereto located with reference to the axis of the gas conducting bore or passageway 82 of the block 81. The axis of the bore corresponds to a vertical line drawn through the axis of shaft 80 in these figures. In the manner depicted, the positions of the elements attached to the shaft may be shown relative to the axis of the shaft. The particular positions of these elements, as indicated by the drawing, are not critical but are illustrated as an example of one satisfactory arrangement. Thus, in Fig. 6, angle A shows the alignment of the handle 91 to be approximately 70° measured counterclockwise from the alignment of the passageway 82 extending through the block 81. The alignment of the keys 93 and 94 is also approximately 70° (angle B) measured counterclockwise with that of the passageway to the tube as shown in Fig. 7. The alignment of keys 96 and 97 is approximately 40° (as indicated by angle C) when measured clockwise from that of the passageway. A cam 100 for operating a button valve 103 is attached to an end-portion of the shaft 80 as illustrated in Figs. 5 and 9. Fig. 9 shows that the cam is attached to the shaft with a radial alignment approximately 130° (angle D) measured clockwise from the alignment of the block passageway. The valve 102 is positioned with its operating button 103 extending vertically beneath, and being movable transversely with respect to, the horizontal path traversed by the shaft 80. When the burner is positioned for heating, the cam 100 engages and depresses the button 103, and the valve 102 is thus opened to feed a fluid fuel to the burner. However, a short movement of the shaft toward the left (referring to Fig. 1) takes the cam 100 out of engagement with the valve button and reduces the amount of fuel available to the burner. Thus, in moving the burner to the retracted position wherein the keys 93 and 94 extend between the rollers 85 to 88, the valve assumes its closed setting. If it is desired to have the burner produce a full flame without the necessity of igniting the fuel each time the burner is moved into heating position, a pilot flame may be obtained by providing a small hole through the valve disc or diaphragm of the valve to permit the passage of a small amount of fuel to the burner during closed valve periods. The burner is connected with the valve 102 preferably by a flexible hose 104 attached to a nipple 105 at the discharge end of the valve and to the nipple 83 which extends into the block 81. Preferably, an annular guide or wear ring 106 is attached to the stand 10 through which the hose 104 may be extended to prevent entanglement and abrasion thereof during movements of the burner from the heating position to the retracted position. A fuel may be premixed with compressed air or oxygen prior to entering the valve 102 by the separate supply lines 107 and 108 as shown, or provision made by means (not shown) to mix air with the fuel adjacent the block 81, if preferred.

Heretofore, joints, such as those of the Van Stone type, and flared or flanged ends have been made on large tubes principally by a primarily manual procedure comprising alternately heating and hammering the end-portions of the tube into shape. The present invention provides a machine such as herein described for making such joints or flared end-portions with little or no manual working of the material of the tube, with a great saving of labor, and at relatively low cost. Furthermore, joints that are made in such a machine are accurately and smoothly constructed and therefore less subject to leaking.

While a preferred embodiment of the invention has been shown and described, it is to be understood that changes and variations may be made without departing from the spirit and scope of the invention as defined in the appended claims.

I claim:

1. Apparatus for flaring the end portions of a straight tube comprising a holder for supporting the tube in fixed relationship therewith with the end portions of the tube projecting beyond adjacent end surfaces of the holder, means for pivotably supporting the holder on an axis of retation extending transversely to the longitudinal axis of a tube supported by the holder approximately midway along the length of the tube, said holder being rotatable to bring either end portion of the tube into a work station, an annular flaring die, ram means for reciprocably supporting the die in coaxial relationship with a tube mounted in said holder when positioned with an end portion in said work station, the ram means being reciprocable lengthwise of said axis to traverse the die into and out of said end portion, stationary means for supporting the ram means, said supporting means and the holder having portions in adjacent opposing relationship at each position of the holder which disposes an end portion of the tube held thereby in said work station, and non-elongatable means for readily connecting said opposing portions to assure coaxial alignment of the die and the tube and to prevent separation of the holder and the supporting means as a result of compressive forces developed by the ram means and the die on the tube.

2. Apparatus for flaring the end portions of a straight tube comprising a holder for supporting the tube in fixed relationship with the end portions of the tube projecting beyond adjacent end surfaces of the holder, means for pivotably supporting the holder on an axis of rotation extending perpendicularly to the longitudinal axis of a tube supported by the holder and midway of the length of the tube, said holder being rotatable to bring either end portion of the tube into a work station, an annular flaring die, ram means for supporting the die in coaxial relationship with a tube mounted in said holder when positioned with an end portion of the tube in said work station, the ram means being reciprocable lengthwise of said axis in said position of the holder to traverse the die into and out of said end portion, stationary means for reciprocably supporting the ram means, said supporting means and the holder having portions in adjacent opposing relationship at each position of the holder which disposes an end portion of the tube held thereby in said work station, and means for connecting said opposing portions comprising detent means extending transversely with respect to the direction of reciprocation of the ram means from one of the opposing portions, and hook means pivotably attached to the other of said opposing portions adapted to hook over and engage the detent means.

3. Apparatus as defined in claim 2 wherein the detent means comprises a pair of dogs extending in opposite directions from opposite sides of one of said portions to which they are attached, and the hook means comprises a pair of hooks attached to opposite sides of the other of said portions, each hook being mounted to engage one of the dogs when the holder is positioned for coaxial relationship of the die and a tube carried by the holder.

4. Apparatus for flaring the end portions of a straight tube comprising a holder for supporting the tube in fixed relationship therewith with the end portions of the tube projecting beyond adjacent end surfaces of the holder, means for pivotably supporting the holder on an axis of rotation extending perpendicularly to the longitudinal axis of a tube supported by the holder at a point and midway of the length of the tube, said holder being rotatable to bring either end portion of the tube into a work station, an annular flaring die, ram means for supporting the die in coaxial relationship with a tube mounted in said holder when positioned with an end portion of the tube in said work station, the ram means being reciprocable lengthwise of said axis when the holder occupies said position to traverse the die into and out of said end portion, stationary means for reciprocably supporting the ram means, said supporting means and the holder having portions in adjacent opposing relationship at each position of the holder which disposes an end portion of the tube in said work station, and holding means for readily connecting said opposing portions for coaxially aligning the die and the tube and preventing separation of the holder and the supporting means as a result of force developed by the ram means between the die and the tube, the holder and the supporting means having also overlapping portions of which opposed surfaces are approximately surfaces of revolution with respect to the axis of rotation of the holder, said surfaces of the overlapping portions engaging each other upon rotation of the holder into place to bring an end portion of the tube into said work station.

References Cited in the file of this patent

UNITED STATES PATENTS

| Number | Name | Date |
|---|---|---|
| 758,145 | Nordenskjold | Apr. 26, 1904 |
| 770,072 | Jones | Sept. 13, 1904 |
| 840,270 | Thiel | Jan. 1, 1907 |
| 1,000,122 | Reynolds | Aug. 8, 1911 |
| 1,420,970 | Cornell | June 27, 1922 |
| 1,472,047 | Carlson | Oct. 30, 1923 |
| 1,472,278 | Mueller | Oct. 30, 1923 |
| 1,719,331 | Kemp | July 2, 1929 |
| 1,776,735 | Leefeld | Sept. 23, 1930 |
| 1,863,445 | Kerr | June 14, 1932 |
| 2,183,362 | Zimmermann | Dec. 12, 1939 |
| 2,359,249 | Scheer | Sept. 26, 1944 |
| 2,375,119 | Tourneau | May 1, 1945 |
| 2,384,740 | Heckethorn | Sept. 11, 1945 |
| 2,412,758 | Smith | Dec. 17, 1946 |
| 2,442,224 | Vaill | May 25, 1948 |
| 2,469,775 | Lohmann | May 10, 1949 |
| 2,532,250 | Watts | Nov. 28, 1950 |
| 2,536,937 | Hosea | Jan. 2, 1951 |
| 2,580,939 | Meriam | Jan. 1, 1952 |
| 2,593,295 | Granfield | Apr. 15, 1952 |

FOREIGN PATENTS

| Number | Country | Date |
|---|---|---|
| 1,533 | Great Britain | Feb. 2, 1886 |
| 314,280 | Great Britain | June 27, 1929 |
| 555,110 | Great Britain | Aug. 4, 1943 |